United States Patent
Darmawaskita et al.

(10) Patent No.: US 7,231,533 B2
(45) Date of Patent: Jun. 12, 2007

(54) WAKE-UP RESET CIRCUIT DRAWS NO CURRENT WHEN A CONTROL SIGNAL INDICATES SLEEP MODE FOR A DIGITAL DEVICE

(75) Inventors: Hartono Darmawaskita, Chandler, AZ (US); Layton Eagar, Tempe, AZ (US); Ryan Scott Ellison, Chandler, AZ (US); Vivien Delport, Chandler, AZ (US)

(73) Assignee: Microchip Technology Incorporated, Chandler, AZ (US)

( * ) Notice: Subject to any disclaimer, the term of this patent is extended or adjusted under 35 U.S.C. 154(b) by 423 days.

(21) Appl. No.: 10/924,488

(22) Filed: Aug. 24, 2004

(65) Prior Publication Data

US 2005/0138454 A1    Jun. 23, 2005

Related U.S. Application Data

(60) Provisional application No. 60/532,323, filed on Dec. 23, 2003.

(51) Int. Cl.
G06F 1/26 (2006.01)

(52) U.S. Cl. .................. 713/323; 713/320; 327/143

(58) Field of Classification Search ............... 713/320, 713/323, 324; 327/143
See application file for complete search history.

(56) References Cited

U.S. PATENT DOCUMENTS

| | | | |
|---|---|---|---|
| 4,970,408 A * | 11/1990 | Hanke et al. ............. | 327/143 |
| 5,454,114 A | 9/1995 | Yach et al. ............... | 395/750 |
| 5,576,650 A * | 11/1996 | Hirotani et al. .......... | 327/142 |
| 5,630,090 A * | 5/1997 | Keehn et al. ............. | 711/106 |
| 5,790,873 A | 8/1998 | Popper et al. ......... | 395/750.01 |
| 5,842,028 A * | 11/1998 | Vajapey ................... | 713/310 |
| 5,878,264 A * | 3/1999 | Ebrahim .................. | 713/323 |
| 5,991,887 A * | 11/1999 | Ezell ....................... | 713/340 |
| 6,141,764 A * | 10/2000 | Ezell ....................... | 713/340 |
| 6,288,584 B1 | 9/2001 | Wu et al. ................. | 327/143 |
| 6,367,024 B1 * | 4/2002 | Ezell ....................... | 713/340 |
| 6,566,928 B1 | 5/2003 | Miyagi .................... | 327/217 |
| 6,747,492 B2 * | 6/2004 | Govil et al. .............. | 327/143 |

FOREIGN PATENT DOCUMENTS

EP     0 426 351 A    5/1991
WO    WO 95/18998    7/1995

OTHER PUBLICATIONS

International Search Report, Dec. 15, 2004.

* cited by examiner

*Primary Examiner*—Chun Cao
(74) *Attorney, Agent, or Firm*—Baker Botts L.L.P.

(57) ABSTRACT

A wake-up reset circuit is provided that generates a reset signal to a digital circuit upon a wake-up event. The wake-up reset circuit places the digital circuit into a known reset condition upon wake-up, even if a brown out condition occurs which may have caused unstable and unknown logic states in sequential circuit elements, e.g., volatile memory, flip flops and/or latching circuits. The wake-up reset circuit draws substantially no current when not generating the reset signal.

26 Claims, 5 Drawing Sheets

WAKE-UP RESET CIRCUIT DRAWS NO CURRENT WHEN A CONTROL SIGNAL INDICATES SLEEP MODE FOR A DIGITAL DEVICE

RELATED PATENT APPLICATION

This non-provisional patent application claims priority to commonly owned provisional patent application USSN 60/532,323, filed Dec. 23, 2003, entitled "Wake Up Reset Circuit" by Hartono Darmawaskita, Layton W. Eagar, Ryan Scott Ellison and Vivien Delport, and is hereby incorporated by reference herein for all purposes.

BACKGROUND OF THE INVENTION TECHNOLOGY

1. Field of the Invention

The present invention relates generally to digital electronic circuits. More specifically, the present invention relates to wake-up reset circuits that generate integrated circuit ("chip") reset upon a wake-up event.

2. Background of the Related Technology

Electronic circuits have been used to monitor the voltage of a power source to an electronic device in order to detect a required voltage threshold in generating a power on reset ("POR") for the electronic device. The same or other circuits have been used to detect a brown out or power down condition. Typically POR and brown out detection circuits require a quiescent current at all times in order to function. For battery operated electronic devices, this quiescent current is a significant factor in the reduction of battery life, particularly for devices that are expected to be operable for extended periods of time. Other problems inherent with POR and/or brown out circuits are proper operation when a power source is below a critical voltage such that the digital logic circuits may be in unpredictable "meta-stable" states, and in applications in electrically noisy environments. Some success for these problems has been achieved using time delay and extensive filtering circuits.

There is, therefore, a need in the art for a reset circuit that does not require a continuous quiescent current, yet can reset a digital device, e.g., a digital processor, microcontroller, microprocessor, application specific integrated circuit (ASIC), programmable logic array (PLA), digital signal processor (DSP), etc., even when recovering from a low voltage or noisy condition.

SUMMARY OF THE INVENTION

The invention overcomes the above-identified problems as well as other shortcomings and deficiencies of existing technologies by providing a wake-up reset ("WUR") circuit that draws substantially no quiescent current while a digital device associated therewith is in a sleep mode. Thus, the present invention draws a minimum amount of power so as not to be detrimental to the useful operating time of a limited energy storage power source, e.g., battery, capacitor, inductor, solar cell, fuel cell, etc., operated system. In addition, the present invention operates for its intended purpose even when the power source (PS) is at a low voltage that may cause meta-stable conditions in the digital device. The PS may be a discharging battery and/or a battery being replaced by the user, an energy storage device such as a capacitor or an inductor being discharged, a solar cell in a shadow, etc. In addition, the present invention also may reliably function in electrically noisy environments.

The wake-up reset circuit of the present invention generates a reset signal upon a wake-up event of a digital device, such as a digital processor, e.g., microcontroller, microprocessor, application specific integrated circuit (ASIC), programmable logic array (PLA), digital signal processor (DSP), etc. Therefore, the circuit always puts the digital device into a known reset condition upon wake-up, even if a brown out or power loss condition has occurred. This is particularly advantageous because brown out conditions may potentially corrupt some of the sequential circuit elements, e.g., flip flops or latches in the digital device. The digital device and wake-up reset circuit preferably are fabricated in an integrated circuit die and the integrated circuit die may be enclosed in an integrated circuit package.

The WUR circuit may be powered by a control signal, which normally is used to control whether a digital processor is in a sleep mode or "SLEEP." When a SLEEP control signal is active, the WUR circuit is turned off and draws substantially no quiescent current while in the sleep mode. When the digital processor wakes up, power is applied to the WUR circuit, and the WUR circuit generates a reset signal to the digital processor. After some delay, the reset signal becomes inactive, and the WUR circuit turns itself off (generates a reset signal for a certain time duration) until the next wake-up event occurs.

If the power supply voltage is below the minimum operating threshold of the digital circuit when the WUR is activated, the WUR circuit will continue generating a reset output until the supply voltage goes above the minimum operating threshold, $V_{WUR}$. At that time, the reset signal continues to be asserted for some additional delay time, then reset becomes de-asserted and the WUR circuit turns itself off and draws substantially no quiescent current.

The user may (optionally) enable or disable the WUR circuit using a bit in non-volatile memory of the digital device. In one embodiment, the non-volatile bit is implemented using a fuse in the configuration word of the digital device. Other means of controlling the enable signal may be flash technology, electrically erasable programmable read only memory (EEPROM), using an external pin of an integrated circuit package containing the digital device which the user can connect to either ground or power supply voltage at the board level, etc. Still other controlling mechanisms are possible that perform the same functionality as the examples given above.

In addition to a wake-up condition, the WUR circuit can be activated by a signal transition on a dedicated WUR input. For reliable WUR operation, the circuitry to this WUR input is designed such that no sequential circuit element, e.g., flip flop, latches, etc., can disable the signal path to enable the WUR circuit.

Features and advantages of the invention will be apparent from the following description of the embodiments, given for the purpose of disclosure and taken in conjunction with the accompanying drawings.

BRIEF DESCRIPTION OF THE DRAWINGS

A more complete understanding of the present disclosure and advantages thereof may be acquired by referring to the following description taken in conjunction with the accompanying drawings, wherein.

Figure 1:
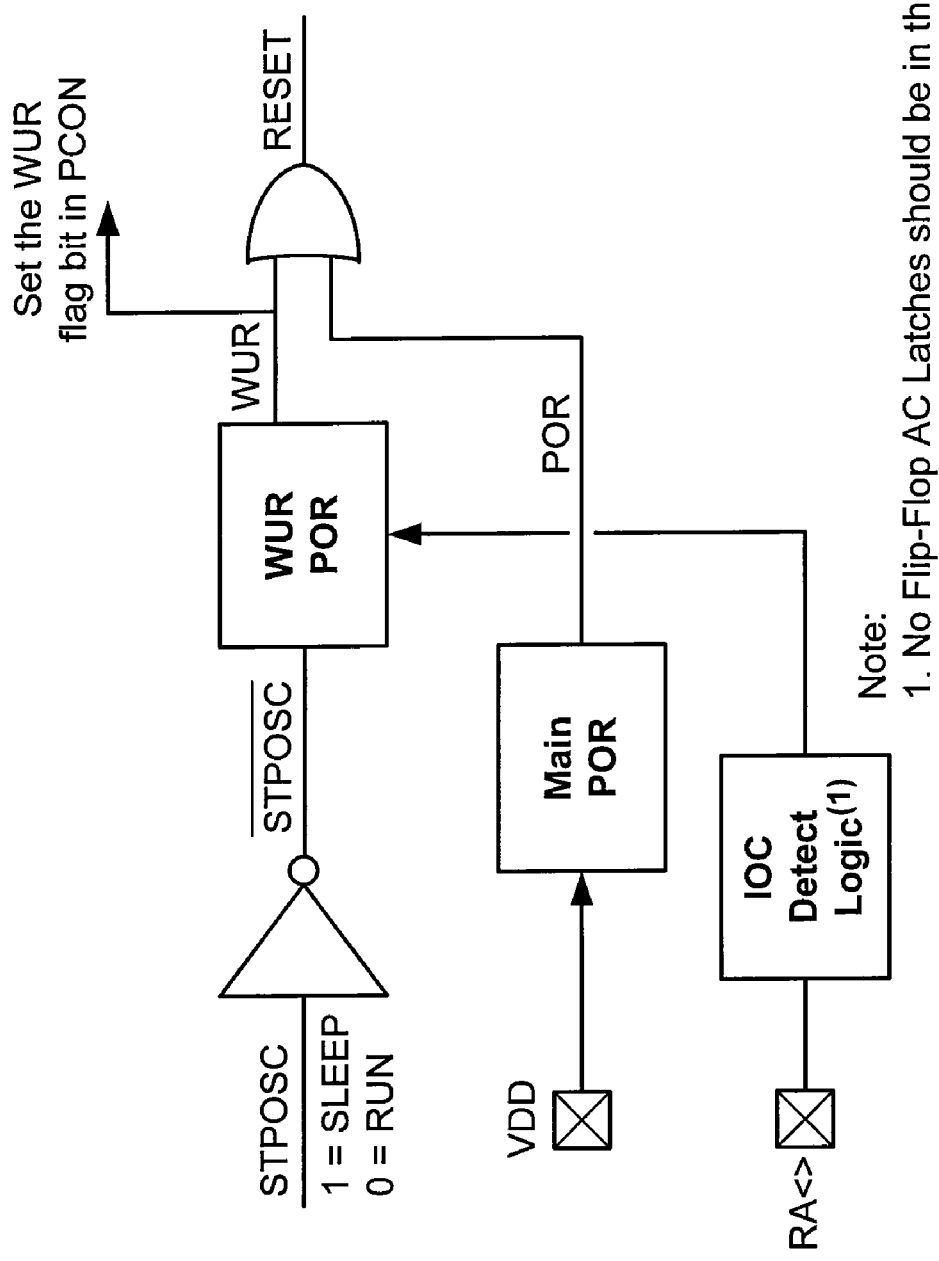
FIG. 1 is a schematic logic block diagram of a specific embodiment of the invention.

While the present invention is susceptible to various modifications and alternative forms, specific exemplary embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

The invention performs a wake-up reset of a digital device, having sleep and wake-up modes of operation, whenever a wake-up signal is received by the digital device (e.g., a digital processor, microcontroller, microprocessor, application specific integrated circuit (ASIC), programmable logic array (PLA), digital signal processor (DSP), etc.).

Referring now to the drawings, the details of specific embodiments of the present invention are schematically illustrated. Like elements in the drawings will be represented by like numbers, and similar elements will be represented by like numbers with a different lower case letter suffix.

Referring now to FIG. 1, depicted is a schematic logic block diagram of a specific exemplary embodiment of the invention. The wake-up reset ("WUR") module, generally represented by the numeral 100, comprises wake-up reset ("WUR") circuit 102, main power on reset (POR) 104 and an OR-gate 108. Optionally, an inverter 110 may be used for inverting the SLEEP input 118 to a /SLEEP output 120, logic levels indicating sleep and run states of the digital device.

The wake-up reset ("WUR") module 100 generates a reset from the output 116 of the OR-gate 108 upon the digital device's wake-up event. Therefore, the WUR module 100 places the digital device in a known reset condition upon the occurrence of a wake-up event, even if a brown out condition also occurs. This is particularly advantageous because brown out conditions potentially can corrupt some of the sequential circuit elements, e.g., flip flops or latches, comprising the digital device.

The WUR module 100 is activated by a control signal 118 (e.g., SLEEP), which normally is used to control whether the digital device is in a sleep mode or an operating (run) mode. When in the sleep mode, the control signal 118 is at a logic high and the output of the inverter 110 is at a logic low (signal 120). Absent a logic high control signal 120, the WUR circuit 102 is turned off and draws substantially no quiescent current while in its sleep mode. When the digital device is told to wake up, power is applied to the WUR circuit 102, and the WUR circuit 102 generates a WUR signal 122 that causes the OR-gate 108 to generate a reset signal 116 to the digital device. After a certain delay, the reset signal 116 becomes inactive, and the WUR circuit 102 turns itself off until the next wake-up event occurs. The WUR signal 122 may also be used as a status bit indication of the activity of the WUR circuit 102.

If the digital device power supply voltage is below a minimum operating threshold when the WUR module 100 is activated, the WUR module 100 will continue generating a reset output 116 until the supply voltage goes above the correct operating threshold, e.g., $V_{WUR}$. At that time, the reset signal 116 continues to be asserted for some additional desired delay time, then reset 116 becomes de-asserted and the WUR module 100 turns itself off.

The user can (optionally) enable the WUR module 100 using a bit in a non-volatile memory of the digital device, e.g., the non-volatile bit may be implemented using a fuse in the configuration word, flash memory technology, using a input-output (I/O) pin which may be connected to either ground or power supply voltage at the digital system board level. Still other controlling mechanisms are possible that perform the same functionality as the examples given above and would be readily apparent to those having ordinary skill in digital circuit technology and having the benefit of this disclosure.

In addition to a wake-up condition, the WUR module 100 can be activated by a signal transition, for example, on a dedicated wake-up on change (WOC) input 114. For reliable WUR operation, the circuitry to WOC pin 114 may be designed such that no sequential circuit, e.g., flip flop or latch can disable the signal path to enable the WUR circuit 102. In another specific embodiment, instead of wake-up and resume, a fuse option may enable the WUR feature only. The SLEEP signal at input 118 may be used to initiate the WUR circuit 102.

Figure 2:
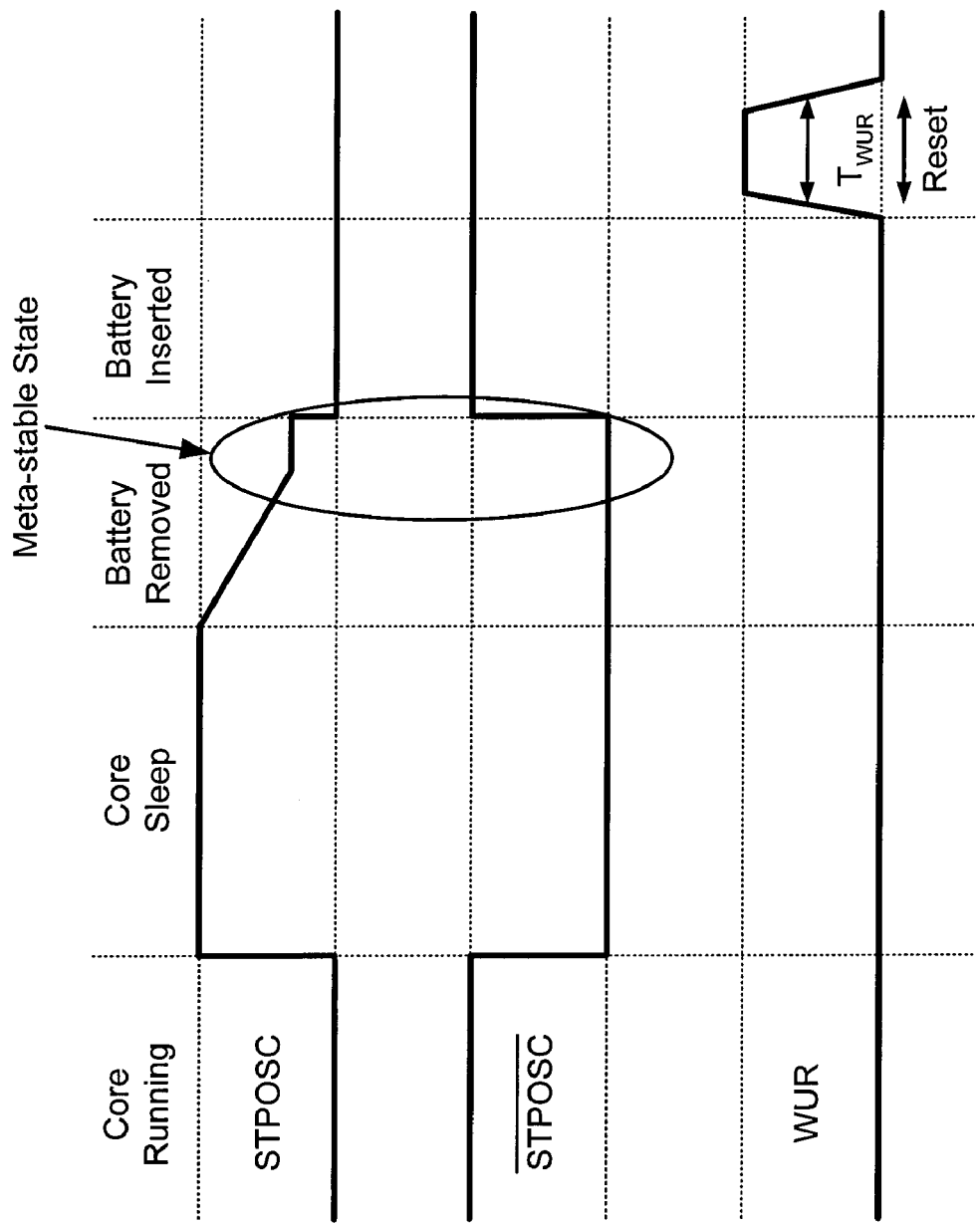
FIG. 2 is a wake-up reset timing diagram illustrating operation of a specific embodiment when a power source is disabled, then enabled and the device immediately wakes up.

Referring now to FIG. 2, depicted is a wake-up reset (WUR) timing diagram illustrating operation of a specific embodiment when a power source (PS), e.g., a battery, is disabled, e.g., disconnected, and then enabled e.g., reconnected, in a digital device. The digital device is in a sleep mode, and for example, an old battery is removed from the digital device. Once a new battery is installed, the SLEEP signal 118 goes to a logic low and the /SLEEP 120 goes to a logic high, causing the WUR signal output 122 to go to a logic high for a "Reset" time period which causes the reset signal output 116 to go to a logic high, sending a reset to the digital device. The Meta-stable state does not affect the WUR module 100 since there are no sequential circuit elements, e.g., flip flop or latches associated therewith.

Figure 3:
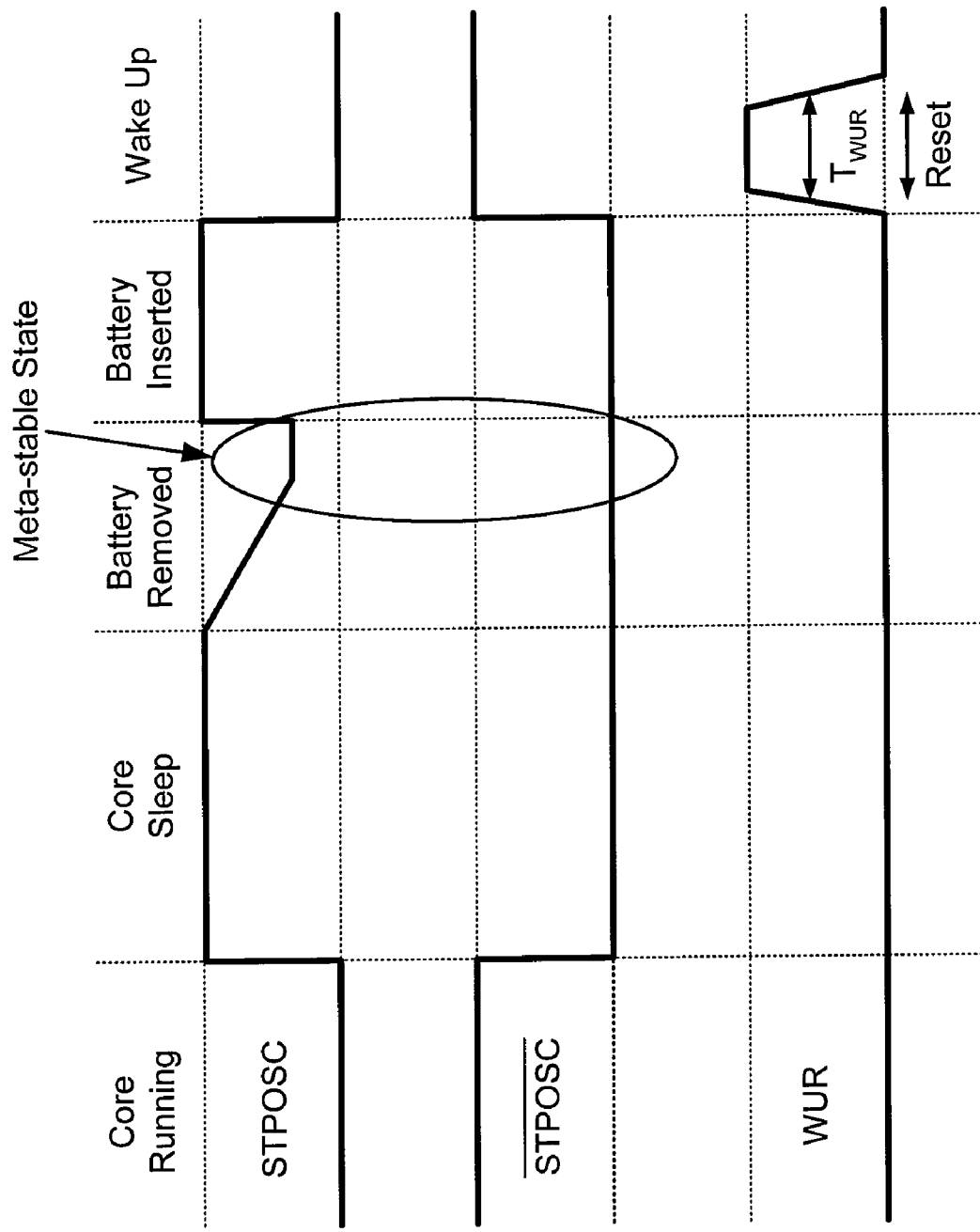
FIG. 3 is a wake-up reset timing diagram illustrating operation of a specific embodiment after a power source is disabled and the digital device stays in a SLEEP mode as the power source is enabled.

Referring now to FIG. 3, depicted is a wake-up reset timing diagram illustrating operation of a specific embodiment after a power source is disabled and the digital device stays in a SLEEP mode as the power source is enabled. The digital device is in a sleep mode and the power source is disabled, e.g., old battery is removed from the digital device. After a new battery is installed, when the SLEEP signal 118 goes to a logic low due to a normal wake-up event, and the logic high control signal 120 goes to a logic high, causing the WUR signal 122 to go to a logic high for a "Reset" time period which causes the reset signal 116 to go to a logic high, sending a reset to the digital device. The metastable state does not affect the WUR module 100 since there are no sequential circuit elements, e.g., flip flop or latch circuits associated therewith.

Figure 4:
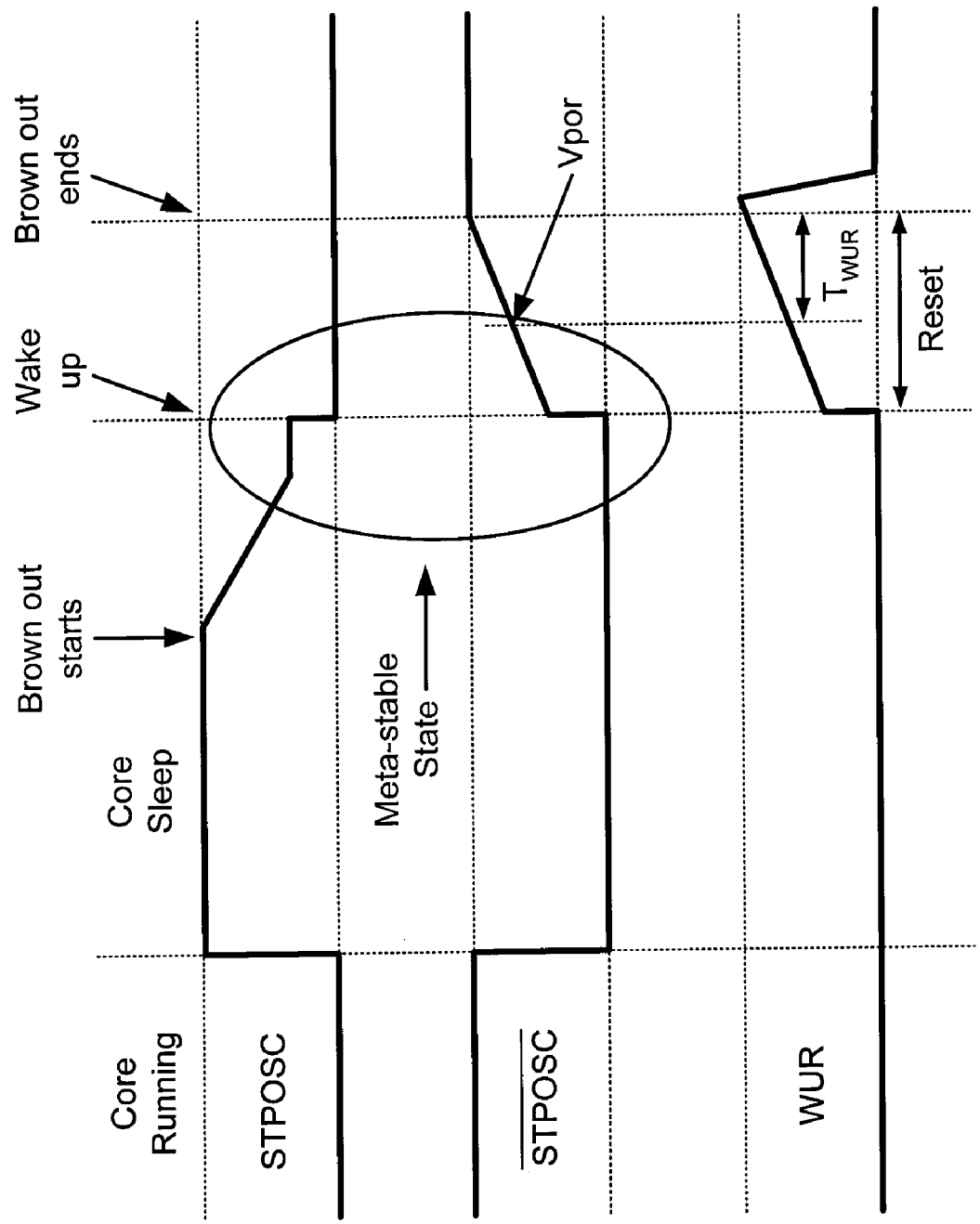
FIG. 4 is a wake-up reset timing diagram illustrating operation of a specific embodiment during a brown-out condition where the digital device main power on reset did not rearm and the device wakes up during metastable state.

Referring now to FIG. 4, depicted is a wake-up reset timing diagram illustrating operation of a specific embodiment during a brown-out condition where the digital device main power on reset did not rearm. In the example of FIG. 3, it is possible that an interrupt enable bit may be corrupted. In this case, a device input-output controller (IOC) (not shown) cannot wake-up the digital device. The solution to this problem is to use logic to decode signals from the IOC, and these signals cannot be gated with any sequential circuit elements, e.g., flip-flops, latch, register output (i.e., enable bits). Secondly, the logic output can be used to rearm the WUR circuit 102. Assertion of the WUR signal 122 occurs during a wake-up event and remains asserted (logic high) slightly after when the brown out ends.

Figure 5:
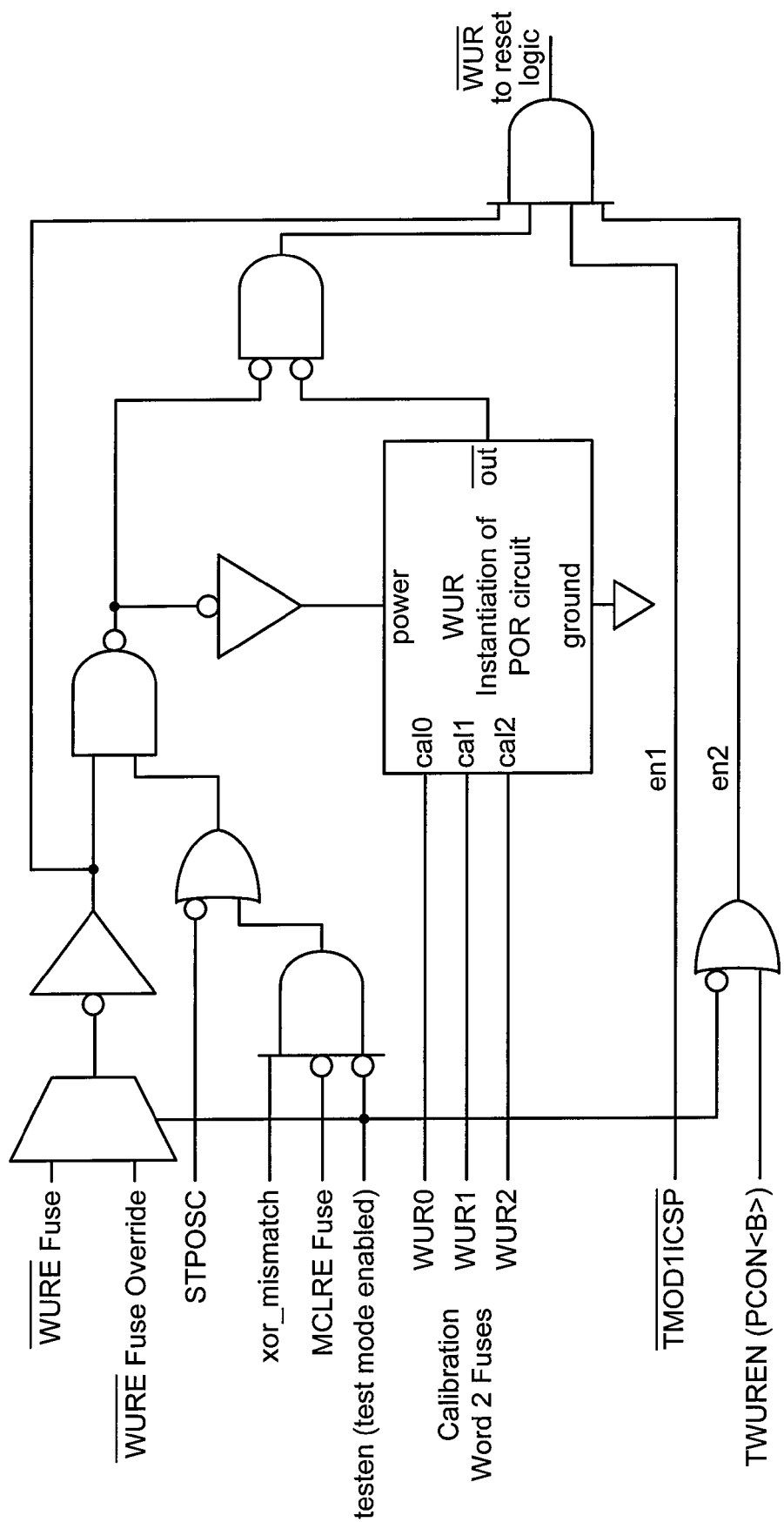
FIG. 5 is a more detailed exemplary schematic circuit diagram of the wake-up reset circuit of FIG. 1.
Figure 1:
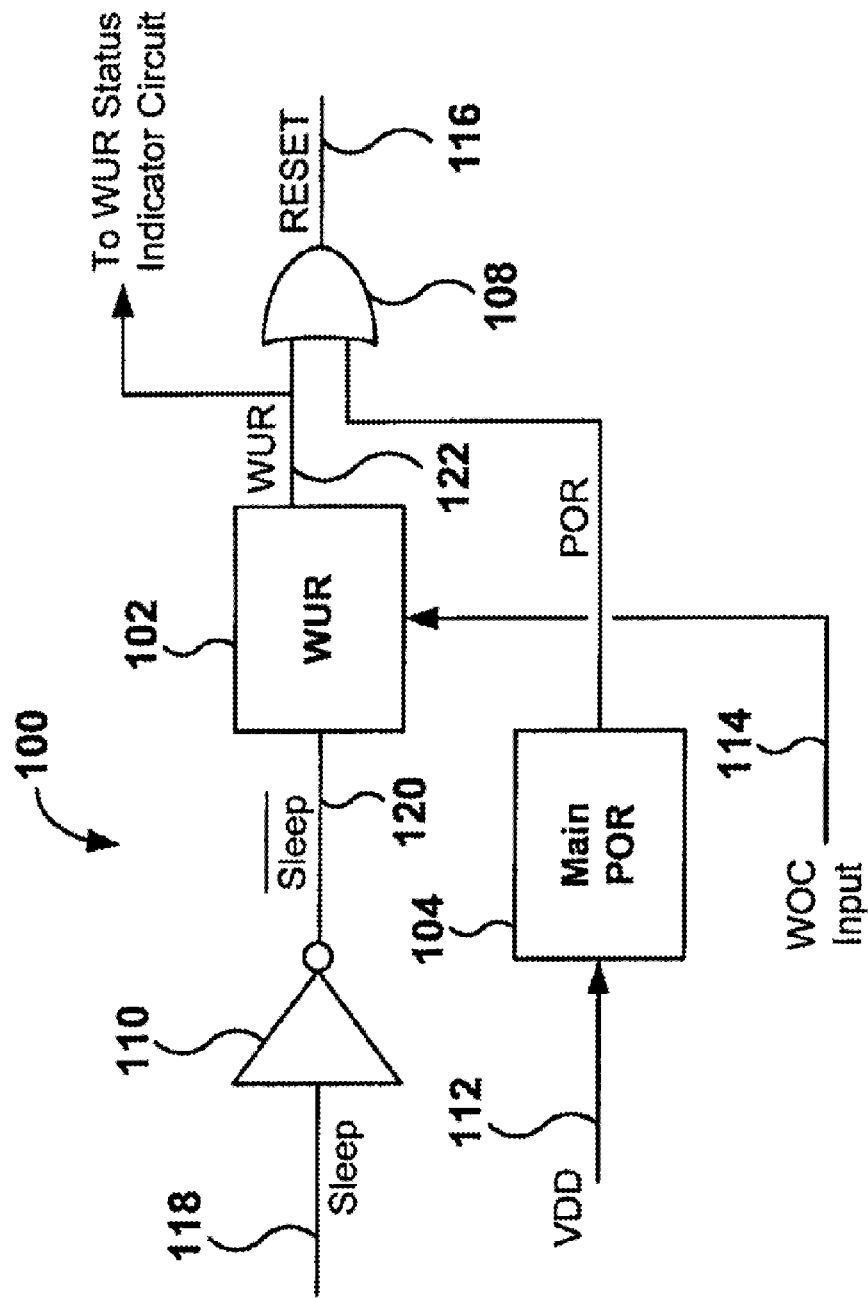

FIG. 5 illustrates a more detailed exemplary schematic circuit diagram of the WUR module 100 of FIG. 1. The POWER input 514 to the WUR Circuit 502 is used to apply power the WUR circuit 502. When the WUR Circuit 502 is in SLEEP mode (SLEEP signal 516 is high), the POWER input 514 is turned off. During this SLEEP mode, the WUR circuit 502 is not powered, and therefore draws no current. When the WUR circuit 502 wakes up the POWER input 514 goes high, and the WUR circuit 502 starts to operate. The WUR Circuit 502 first generates a wake-up reset (WUR) output 518, and monitors the voltage level of signal at the POWER input 514. If this voltage level is lower than a voltage threshold, $V_{WUR}$, then the WUR Circuit 502 continues to hold the WUR output 518 active. When the POWER input 514 voltage level goes above the $V_{WUR}$ threshold, the WUR circuit 502 will deactivate the WUR output 518. When the WUR module 100 is enabled (by setting the ENABLE signal 520 high), the WUR output 518 is passed on to the RESET circuit (output 116, FIG. 1), which may be used to manage an integrated circuit device reset signal.

A wake-up on change (WOC) signal 522 is another input to the WUR module 100. When the ENABLE signal 520 is high and the WUR Circuit 502 is in SLEEP mode, a high level on the WOC signal 522 will cause the POWER input 514 to go high and thus turn on the WUR Circuit 502. At this point the same operation occurs (WUR output 518 becomes active and will be monitored until the voltage at the POWER input 514 is greater than $V_{WUR}$).

The trip point $V_{WUR}$ may be calibrated (or adjusted) to compensate for process variations and design tolerances in the integrated circuit manufacturing process. During the testing of the an integrated circuit containing the WUR module 100, the trip point $V_{WUR}$ may be measured and then calibrated (e.g., using a calibration input bus 512) until the desired WUR voltage trip point has been determined. The calibration value may then be stored in a non-volatile memory.

The invention, therefore, is well adapted to carry out the objects and attain the ends and advantages mentioned, as well as others inherent therein. While the invention has been depicted, described, and is defined by reference to specific embodiments of the invention, such references do not imply a limitation on the invention, and no such limitation is to be inferred. The invention is capable of considerable modification, alternation, and equivalents in form and function, as will occur to those ordinarily skilled in the pertinent arts and having the benefit of this disclosure. The depicted and described specific embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. A digital apparatus comprising:
   a digital device having a reset input;
   a non-volatile memory; and
   a wake-up reset circuit having an output coupled to the reset input of the digital device, a control input coupled to a sleep-run control signal and an enable-disable input for enabling and disabling the wake-up reset circuit, wherein
      when the sleep-run control signal indicates a sleep mode for the digital device the wake-up on reset circuit draws substantially no current, and
      when the sleep-run control signal transitions from the sleep mode to an operating mode for the digital device the wake-up reset circuit outputs a reset pulse to the reset input of the digital device; and
   the enable-disable input is coupled to the non-volatile memory, and the non-volatile memory has a bit representing enabling or disabling the wake-up reset circuit when in a first or second logic level, respectively.

2. The digital apparatus according to claim 1, wherein when in the operating mode the sleep-run control signal powers the wake-up reset circuit.

3. The digital apparatus according to claim 1, further comprising a power on reset circuit having an input coupled to a supply voltage and an output coupled to the reset input of the digital device, wherein when the supply voltage is applied to the power on reset circuit the digital device is reset before going into the operating mode.

4. The digital apparatus according to claim 3, wherein an OR gate couples the wake-up reset circuit and the power on reset circuit outputs to the reset input of the digital device.

5. The digital apparatus according to claim 1, wherein there are no sequential circuit elements in the sleep-run control signal to the input of the wake-up reset circuit.

6. The digital apparatus according to claim 1, wherein the wake-up reset circuit further comprises a wake-up on change input that activates the wake-up reset circuit upon a signal transition at the wake-up on change input whereby the wake-up reset circuit outputs the reset pulse.

7. The digital apparatus according to claim 6, wherein there is no sequential circuit elements in the signal transition to the wake-up on change input.

8. The digital apparatus according to claim 1, wherein the enable-disable input is adapted for coupling to either a first or second logic level for enabling or disabling the wake-up reset circuit, respectively.

9. The digital apparatus according to claim 1, wherein the non-volatile memory is flash memory.

10. The digital apparatus according to claim 1, wherein the non-volatile memory is EEPROM.

11. The digital apparatus according to claim 1, wherein the wake-up reset circuit goes into a sleep mode after outputting the reset pulse.

12. The digital apparatus according to claim 1, wherein the wake-up reset circuit draws substantially no current when in the sleep mode.

13. The digital apparatus according to claim 1, wherein the digital device is selected from the group consisting of digital processor, microcontroller, microprocessor, application specific integrated circuit (ASIC), programmable logic array (PLA), and digital signal processor (DSP).

14. The digital apparatus according to claim 1, wherein the digital device and wake-up circuit are fabricated in an integrated circuit die.

15. The digital apparatus according to claim 14, wherein the integrated circuit die is enclosed in an integrated circuit package.

16. A method for doing a wake-up reset of a digital apparatus, said method comprising the steps of:
enabling and disabling a wake-up reset circuit by applying first and second logic levels, respectively, to the wake-up reset circuit, wherein the first and second logic levels are supplied from a non-volatile memory having a bit representing enabling or disabling the wake-up reset circuit when in the first or second logic level, respectively;
generating a reset pulse with the wake-up reset circuit when the wake-up reset circuit is enabled and receives an operating mode signal;
resetting a digital device with the reset pulse; and
placing the wake-up reset circuit into a sleep mode that draws substantially no current after generating the reset pulse.

17. The method according to claim 16, further comprising the step of powering the wake-up reset circuit from the operating mode signal.

18. The method according to claim 16, further comprising the step of resetting the digital device when a power on reset is applied to the digital device.

19. The method according to claim 18, wherein the step of resetting the digital device is done after wake-up.

20. The method according to claim 16, further comprising the step of activating the wake-up reset circuit to generate the reset pulse upon a wake-up on change input.

21. The method according to claim 16, further comprising the steps of:
determining a desired voltage level for the operating mode signal that is above a digital device voltage trip point for stable operation thereof; and
storing the determined desired voltage level.

22. The method according to claim 21, further comprising the step of setting a status bit when the operating mode signal is above the desired voltage level.

23. The method according to claim 21, wherein the digital device will remain reset until the operating voltage of the digital device is above the desired voltage level.

24. The method according to claim 16, further comprising the steps of:
measuring a trip point wake-up reset voltage of the digital device; and
calibrating the wake-up reset circuit with a calibration value representing the measured trip point wake-up reset voltage.

25. The method according to claim 24, further comprising the step of storing the calibration value in a non-volatile memory.

26. The method according to claim 24, further comprising the step of adjusting the trip point wake-up reset voltage of the digital device.

* * * * *

UNITED STATES PATENT AND TRADEMARK OFFICE
CERTIFICATE OF CORRECTION

| | | |
|---|---|---|
| PATENT NO. | : 7,231,533 B2 | |
| APPLICATION NO. | : 10/924488 | |
| DATED | : June 12, 2007 | |
| INVENTOR(S) | : Hartono Darmawaskita et al. | |

It is certified that error appears in the above-identified patent and that said Letters Patent is hereby corrected as shown below:

Please delete old existing formal drawing Fig 1and insert the new formal drawing Fig. 1 that is illustrated as the corrected drawing that is attached.

Signed and Sealed this

Twentieth Day of January, 2009

JON W. DUDAS
*Director of the United States Patent and Trademark Office*